(12) United States Patent
Bacha (10) Patent No.: US 10,318,431 B2
(45) Date of Patent: Jun. 11, 2019

(54) OBSCURATION OF A CACHE SIGNAL (71) Applicant: HEWLETT PACKARD ENTERPRISE DEVELOPMENT LP, Houston, TX (US)

(72) Inventor: Anys Bacha, Dublin, OH (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/744,589

(22) PCT Filed: Sep. 17, 2015

(86) PCT No.: PCT/US2015/050657
§ 371 (c)(1),
(2) Date: Jan. 12, 2018

(87) PCT Pub. No.: WO2017/048257
PCT Pub. Date: Mar. 23, 2017

(65) Prior Publication Data
US 2018/0210839 A1    Jul. 26, 2018

(51) Int. Cl.
*H03K 19/00* (2006.01)
*G06F 12/0893* (2016.01)
(Continued)

(52) U.S. Cl.
CPC ......... *G06F 12/0893* (2013.01); *G06F 12/08* (2013.01); *G06F 12/0802* (2013.01); *G06F 13/16* (2013.01); *G06F 13/1605* (2013.01); *G06F 13/1668* (2013.01); *G09C 1/00* (2013.01); *H04L 9/0866* (2013.01); *H04L 9/3278* (2013.01); *G06F 2212/1052* (2013.01); *H04L 2209/04* (2013.01); *H04L 2209/12* (2013.01); *H04L 2209/16* (2013.01)

(58) Field of Classification Search
CPC ............. G06F 12/0893; G06F 13/1668; G06F 13/1605; G06F 12/0802; G06F 13/16; G06F 12/08; G06F 2212/1052; H04L 9/3278; H04L 9/0866; H04L 2209/16; H04L 2209/12; H04L 2209/04; G09C 1/00
USPC .......................................................... 326/8
See application file for complete search history.

(56) References Cited

U.S. PATENT DOCUMENTS

| 8,850,608 | B2 | 9/2014 | Tehranipocr |
| 2007/0039048 | A1 | 2/2007 | Shelest et al. |

(Continued)

FOREIGN PATENT DOCUMENTS

| WO | WO-2009057094 | 5/2009 |
| WO | WO-2014053286 | 4/2014 |

OTHER PUBLICATIONS

International Search Report & Written Opinion received in PCT Application No. PCT/US2015/050657, dated Jun. 30, 2016, 12 pages.

(Continued)

*Primary Examiner* — Don P Le
(74) *Attorney, Agent, or Firm* — Hewlett Packard Enterprise Patent Department (57) ABSTRACT

Examples herein disclose a cache controller to receive a cache signal. A physical unclonable function (PUF) circuit is coupled to the cache controller. The PUF circuit obscures the cache signal in response to the cache signal receipt.

15 Claims, 5 Drawing Sheets

(51) Int. Cl.
*G06F 12/08* (2016.01)
*G06F 13/16* (2006.01)
*G06F 12/0802* (2016.01)
*G09C 1/00* (2006.01)
*H04L 9/08* (2006.01)
*H04L 9/32* (2006.01)

(56) References Cited

U.S. PATENT DOCUMENTS

| | | | |
|---|---|---|---|
| 2008/0016288 A1* | 1/2008 | Gaither | G06F 12/0842 711/148 |
| 2008/0201574 A1 | 8/2008 | Haneda | |
| 2012/0072737 A1 | 3/2012 | Schrijen | |
| 2012/0093308 A1 | 4/2012 | Choi | |
| 2013/0047209 A1* | 2/2013 | Satoh | H04L 9/3278 726/2 |
| 2013/0322624 A1* | 12/2013 | Kim | H04L 9/002 380/44 |
| 2014/0185795 A1 | 7/2014 | Gotze et al. | |
| 2016/0110130 A1* | 4/2016 | Kan | G06F 21/79 711/163 |
| 2016/0148664 A1* | 5/2016 | Katoh | G11C 13/0059 365/148 |
| 2017/0242660 A1* | 8/2017 | Katoh | G11C 13/0059 |
| 2017/0257222 A1* | 9/2017 | Pedersen | G06F 1/26 |
| 2017/0345492 A1* | 11/2017 | Yoshimoto | G06F 3/0604 |
| 2018/0004661 A1* | 1/2018 | Umehara | G06F 12/0806 |
| 2018/0006830 A1* | 1/2018 | Cambou | G06F 21/44 |

OTHER PUBLICATIONS

Kavehei, O. et al., "mrPUF: A Memristive Device based Physcial Unclonable Function," Feb. 9, 2013, 4 pages, http://arxiv.org/ftp/arxiv/papers/1302/1302.2191.pdf.

Wang, X. et al., "Novel Physical Unclonable Function with Process and Environmental Variations," Mar. 8, 2010, 6 pages, http://ieeexplore.ieee.org/stamp/stamp.jsp?arnumber=5456967.

* cited by examiner

OBSCURATION OF A CACHE SIGNAL

BACKGROUND

A processor cache side-channel is an information source on processor system related to physical phenomena occurring inside of the cache. Examples of such physical phenomena may include power consumption, time consumption, and electromagnetic emissions. This physical phenomena may be observed from outside of the system to reveal information correlated with the internal operation and/or state of the system. For example, the processor cache which may generate electromagnetic emission patterns which correspond to particular operations performed within the cache.

BRIEF DESCRIPTION OF THE DRAWINGS

In the accompanying drawings, like numerals refer to like components or blocks. The following detailed description references the drawings, wherein.

DETAILED DESCRIPTION

Processor caches have become increasingly more vulnerable to side channel attacks that exploit electromagnetic emissions. An attacker may observe the properties of the electro-magnetic emissions produced by transactional data signals in the processor cache. Studying the properties, the entity may be able decipher the transactional data and/or architecture in the processor cache. For example, a cache signal may include confidential information. As such, the cache signal may emit electromagnetic emissions which may be used by an attacker to identify the instructions (e.g., transaction) and payload data being executed on the processor cache system. The data and/or transactions may contain confidential information and thus leakage of this information may be problematic.

To address these issues, examples disclose a system to counter electromagnetic side-channel attacks. The system includes a physical unclonable function (PUF) circuit to obscure a cache signal in a processor cache. The PUF circuit consumes a set of bits and in turn produces a data signal. The production and/or storage of the data signal by the PUF circuit generates electromagnetic emissions. These electromagnetic emissions from the cache signal and the data signal are combined in such a manner that the cache signal is obscured from an attacker. Combining the electromagnetic emissions of the cache signal and the data signal, prevents an attacker from characterizing and/or cloning the electromagnetic emissions of a given transaction to extract information. Obscuring the cache signal, the examples provide a mechanism for securing data in the processor cache from electromagnetic side-channel attacks.

In another example, the system includes a set of PUF circuits in which each PUF circuit produces a different data signal. In this example, each PUF circuits uses a design parameter randomness that is introduced during the manufacturing process. For example, each PUF circuit may vary according to a doping concentration, doping concentration of atoms, oxide thickness, channel lengths, structural width (e.g., of a metal layer), parasitics (e.g., resistance, capacitance), or other manufacturing design. These design parameters may vary slightly between each PUF circuits thus causing the data signals to vary between each of the PUF circuits. This data signal variance may include, by way of example, a bit signal variance, bit rate variance, signal intensity variance, transfer rate variance, bit distribution variance, etc. Generating data signal variance based on intrinsic characteristics of each PUF circuit, leverages the randomness to provide additional security to the information within the cache.

Figure 1:
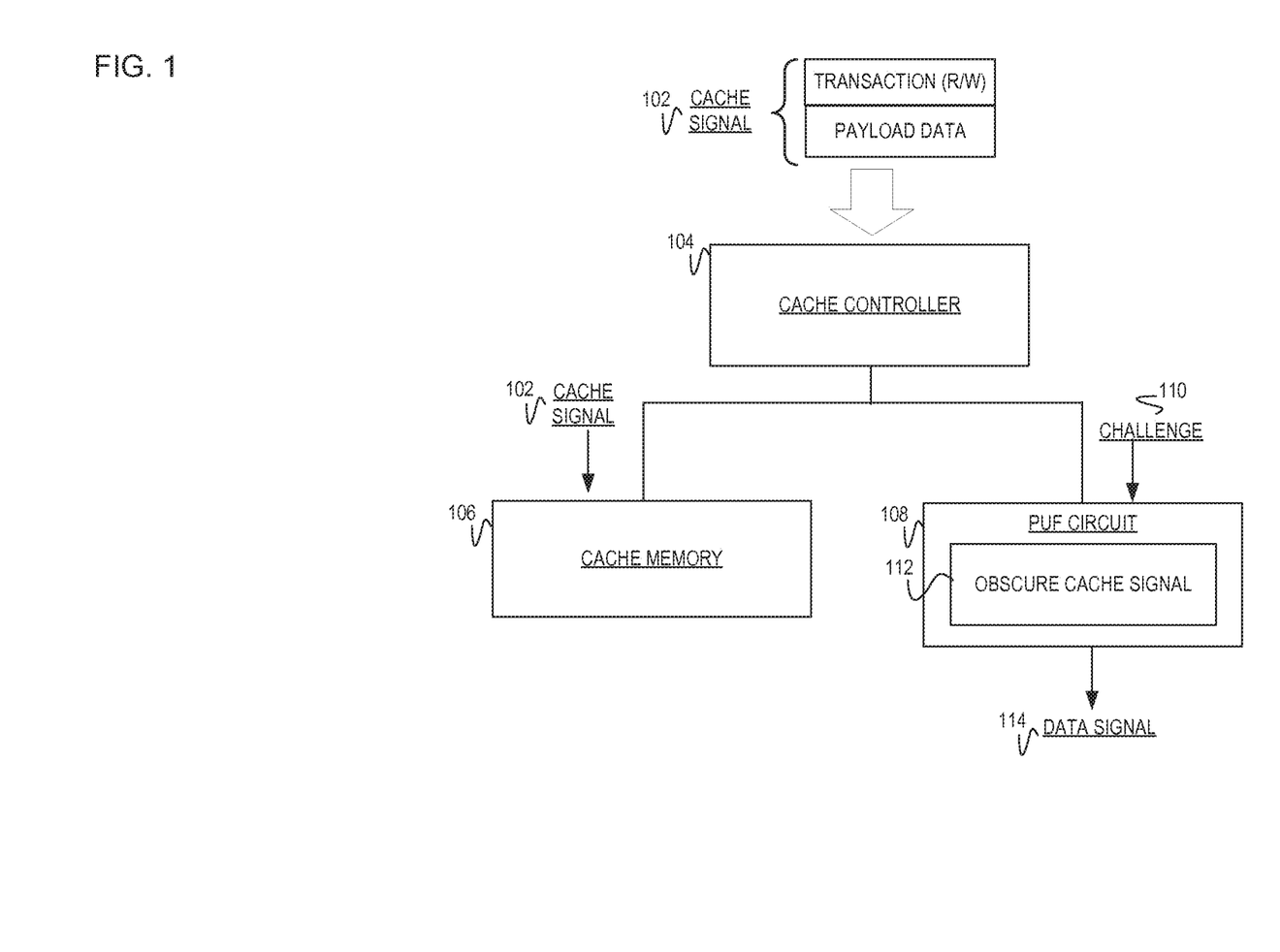
FIG. 1 is a block diagram of an example system including a physical unclonable function (PUF) circuit to obscure a cache signal.

Referring now to the figures, FIG. 1 is a block diagram of an example system including a physical unclonable function (PUF) circuit 108 to obscure a cache signal 102 at module 112. A cache controller 104 receives the cache signal 104 that is directed towards performing a transaction at a cache memory 106. Based on the cache controller 104 receiving the cache signal 102, the PUF circuit 108 receives a challenge 110. The challenge 110 operates as an input to the PUF circuit 108 so that the PUF circuit 108 generates a data signal 114 in response. The data signal 114 produced by the PUF circuit 108 obscures the cache signal 102 at module 112. The system in FIG. 1 represents a processor cache system which reduces the time for a processor to access data. In one implementations, the processor cache system may be organized as a hierarchy of cache levels, such as L1, L2, L3, etc.

The cache signal 102 is issued to the cache controller 104 from the processor's load-store queue (LSQ). As such, the cache signal 102 includes transaction information and payload data. The transaction information is the portion of the cache signal 102 that directs the cache controller 104 performing reading or writing data to the cache memory 106. The cache signal 102 is composed of bits to form the transaction and the payload data. In one implementation upon the cache controller 104 receiving the cache signal 102, the challenge 110 is applied to the PUF circuit 108. In this implementation, the cache signal 102 includes a set of bits that are used as the challenge 108. Thus if there is no cache signal 102 to the cache controller 104, there is no challenge 110 to the PUF circuit 108. In another implementation, the address to the cache memory 106 is used as the challenge 110 for the cache controller 104 to apply to the PUF circuit 108.

The cache controller 104 is hardware component which manages the cache system in FIG. 1. The cache controller 104 receives the cache signal 102 and in response supplies the challenge 110 to the PUF circuit 108 to obscure the cache signal 102. The cache controller 104 includes, by way of example, a microcontroller, integrated circuit, processing device, semiconductor, circuit, or other type of hardware component in a cache system for receiving the cache signal 102 for performance at the cache memory 106 and providing the challenge 110 to the PUF circuit 108.

The cache memory 106 is a memory area internal to the processor for storing data. The cache memory 106 includes, by way of example, a read-only memory, non-volatile storage, volatile memory storage, flash memory, random access memory (RAM), nanodrive, or other type of suitable storage component capable of reading and writing data.

The PUF circuit 108 receives the challenge 110 from the cache controller 110 and in response generates the data signal 114. The PUF circuit 108 consumes the set of bits as the challenge 110 and in turn produces another set of bits that marks the response (i.e., the data signal 114). The production and/or storage of the data signal 114 generates electromagnetic emissions which obscures the cache signal 102 at module 112. In one implementation, the PUF circuit 108 introduces explicitly-introduced randomness which includes the ability for parameters to be controlled and managed. Controlling the parameters within the PUF circuit 108, the data signal 114 produced is based on the controlled parameters. In this implementation the PUF circuit 108 includes, by way of example, an optical PUF, or coating PUF. In another implementation, the PUF circuit 108 may use intrinsic randomness which is introduced during the manufacturing process. The intrinsic randomness may be introduced based on the doping concentration of atoms, oxide thickness, channel lengths, structural width (e.g., of a metal layer), parasitics (e.g., resistance, capacitance), or other manufacturing design. These design parameters will vary slightly between each PUF circuit and causes the behavior of each PUF circuit to behaving differently, thus generating a different data signal 114. In this implementation the PUF circuit 108 includes, by way of example, a delay PUF, static random access memory (SRAM) PUF, butterfly PUF, bistable ring PUF, magnetic PUF, metal resistance PUF, arbiter PUF, ring-oscillator PUF, or other type of PUF which introduces intrinsic randomness. Although FIG. 1 illustrates the PUF circuit 108 as a single component to obscure the cache signal 102 at module 112, implementations should not be limited as the PUF circuit 108 may include a set of PUF circuits. This implementation is explained in detail in the following figures.

The challenge 110 is the set of bits from the cache signal 102 which are used as input to the PUF circuit 108. In one implementation, the address of the cache memory 106 is used as the challenge 110 to apply to the PUF circuit 108.

At module 112, the PUF circuit 108 obscures the cache signal 102. The PUF circuit 108 produces the data signal 114 in response to the challenge 110. The data signal 114 may be stored in an area of the cache system such that the data signal 114 is produced and/or stored simultaneously as the cache signal 102 is performed at the cache memory 106. Producing and/or storing the data signal 114 simultaneously to the cache signal 102 performance, the electromagnetic emissions from the signals 102 and 114 are combined so that the meaningful data (e.g., transaction and payload data) is obscured to an attacker. Module 112 may include, by way of example, instructions (e.g., stored on a machine-readable medium) that, when executed (e.g., by the PUF circuit 108 or the cache controller 104), implement the functionality module 112. Alternatively, or in addition, module 112 may include electronic circuitry (i.e., hardware) that implements the functionality of module 112. Although FIG. 1 illustrates module 112 as internal to the PUF circuit 108, this was done for illustration purposes as the functionality of module 112 may occur externally to the PUF circuit 108.

The data signal 114 is produced as response to the challenge 110 applied to the PUF circuit 108. In one implementation, the data signal 114 is stored simultaneously as the cache signal 102 is performed at the cache memory 106. In this implementation, the electro-magnetic emissions from both the data signal 114 and the cache signal 102 are comingled so that the cache signal 102 is obscured. Obscuring the cache signal 102 makes it difficult for an entity to characterize or map the transaction and/or payload data. In another implementation, the data signal 114 varies from a type of PUF circuit and/or doping concentration of atoms for the PUF circuit 108. In this example, the data signal 114 varies in properties, such as a bit interval, bit rate, intensity of the signal, transfer rate, bit distribution, etc. As such, these characteristics vary according to the type of PUF circuit and/or doping concentration.

Figure 2:
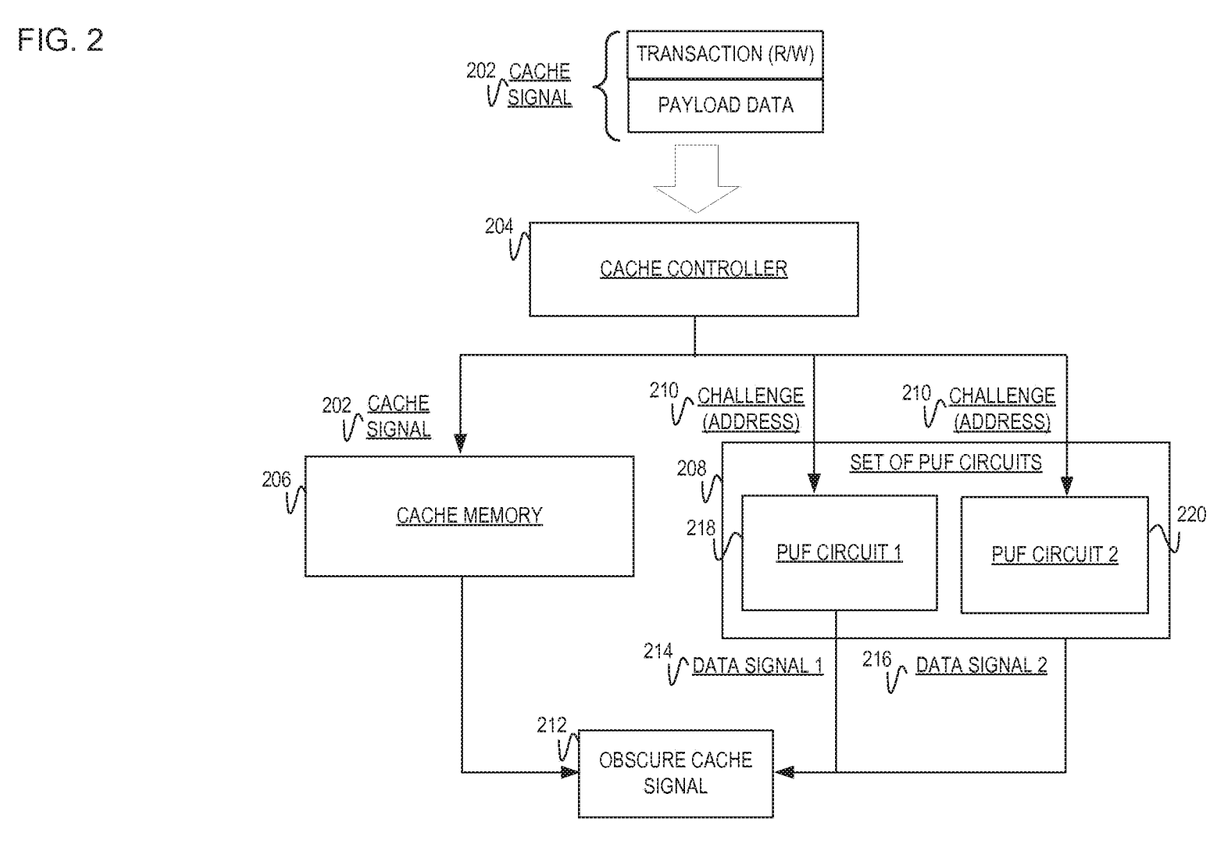
FIG. 2 is a block diagram of an example system including a set of PUF circuits to produce various data signals which are combined for obscuring a cache signal.

FIG. 2 represents a processor cache system to receive a cache signal 202 at a cache controller 204 and in turn obscure the cache signal 202 at module 212. Specifically, FIG. 2 illustrates a set of PUF circuits 208 including a first PUF circuit 218 and a second PUF circuit 220 to produce different data signals 214 and 216, respectively. The different data signals 214 and 216 are produced in such a manner that the electromagnetic emissions from the data signals 214 and 216 are combined with the electromagnetic emissions from a cache signal 202 that obscures the cache signal 202 at module 212. Obscuring the cache signal 202 at module 212, means that transaction data and payload data associated with the cache signal 202 is obscured to an attacker. The attacker would be privy to the overall electromagnetic emissions post-combination of the emissions from the data signals 214 and 216 and the cache signal 202. In this regard, the cache signal 202 is masked or disguised to the attacker.

The cache controller 204 receives the cache signal 202 to perform a transaction at a cache memory 206. Upon receiving the cache signal 202, the cache controller 204 provides a set of bits as the challenge 210 to the set of PUF circuits 208. In one implementation, the set of bits provided as the challenge 210 includes an address of the cache memory 206 in which to read or write data.

The set of PUF circuits 208 includes at least the first PUF circuit 218 and the second PUF circuit 220. The set of PUF circuits 208 receive the set of bits from the cache signal 202 as the challenge 210. Upon receiving the challenge 210, each PUF circuit 218 and 220 in the set of PUF circuits 208 generates a different data signal 214 and 216 in response. The data signals 214 and 216 are different in the sense these data signals 214 and 216 vary in the characteristics or properties. For example, the data signals 214 and 216 may vary based on bit interval, bit rate, intensity of the signal, transfer rate, bit distribution, etc. Varying these data signals 214 and 216 provides an additional randomness to safeguard against an attacker.

In one implementation, the first PUF circuit 218 is a different type of PUF circuit from the second PUF circuit 220. For example, the first PUF circuit 218 may include a ring-oscillator PUF circuit and the second PUF circuit 220 may include an arbitrator PUF circuit. Using different types of PUF circuits, the set of PUF circuits 208 may generate data signals 214 and 216 which vary in characteristics or properties. In another implementation, the intrinsic properties varies between the PUF circuits 218 and 220 such that the properties of the data signals 214 and 216 vary. For example, each of the PUF circuits 218 and 220 may receive the same set of bits in the challenge 210 but because the doping concentrations may vary between each of the PUF circuits 218 and 220, this variance in turn will cause the data signals 216 and 216 to vary.

Figure 3:
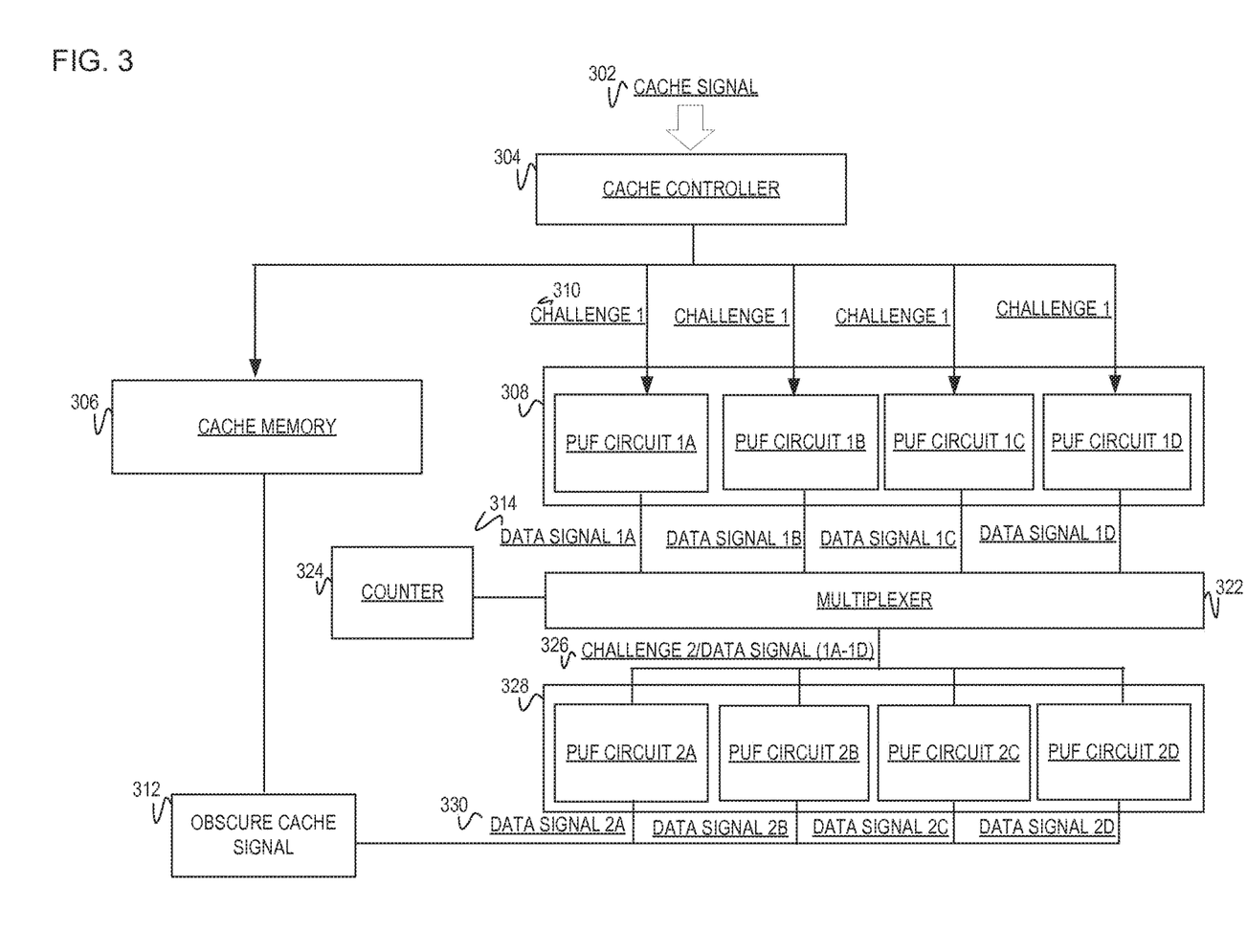
FIG. 3 is a block diagram of an example system including a first set of PUF circuits and a second set of PUF circuits to obscure a cache signal.

FIG. 3 illustrates a block diagram on example cache system including a set of PUF circuits 308 to produce a first set of data signals 314 as input to a multiplexer 322. The multiplexer 322 is coupled to a counter 324 to identify which data signal (Data 1A-1D) should be used as the second challenge 326 to a different set of PUF circuits 328. The different set of PUF circuits 328 generates a different set of data signals 330 (Data Signal 2A-2D). The different set of data signals 330 are used to obscure to cache signal 302 at module 312.

Initially, a transaction (e.g., read or write) as part of the cache signal 302 is issued to the cache controller 304 the processor's load-store-queue (LSQ). The cache controller 304 receives the cache signal 302 including the transaction and forwards the transaction to the cache memory 306. Upon receiving the cache signal 302 the cache controller 304 forwards the address corresponding to the transaction onto the set of PUF circuits 308. The address is used for generating the challenge 310 which is applied to each of the PUF circuits (PUF Circuit 1A-1D) in the set of PUF circuits 308. Having the set of PUF circuits 308 at this initial level generates random responses in the form of the data signals 314 (Data Signal 1A-1D) that is consumed throughout the cache system. In an implementation, the intrinsic properties of each PUF circuit varies each of the data signals 314 (Date Signal 1A-1D) produced in response to each PUF circuit in the set of PUF circuits 308.

The system includes the multiplexer 322 which receives the varying data signals 314 from the set of PUF circuits 308. As such, the cache system multiplexes between the data signals 314 by attaching a counter 324 to the selector bits of the multiplexer 322. Using the counter 324 further randomizes the selection process between the different PUF circuits to generate the second challenge 326 provided to the set of different PUF circuits 328. This second challenge 326 is shown as identifying one of the data signals 314 (Data Signal 1A-1D) to apply to the different set of PUF circuits 328 as the second challenge 326.

Based on obtaining the second challenge 326 from the one the data signals 314, the second challenge 326 is applied to each of the PUF circuits (PUF Circuit 2A-2D) in the different set of PUF circuits 328. Each of the PUF circuits in the different set of PUF circuits 328 generates the different set of data signals 330 (Data Signal 2A-2D) as a results of the applied second challenge 326. Each of the different set of data signals 330 results in the emission of electromagnetic signals that uses a different access pattern due the variations in each of the PUF circuits. The emissions from the different set of data signals 330 and the emissions from the cache signal 302 are combined to obscure the transaction and/or payload data within the cache signal 302 at module 312.

Figure 4:
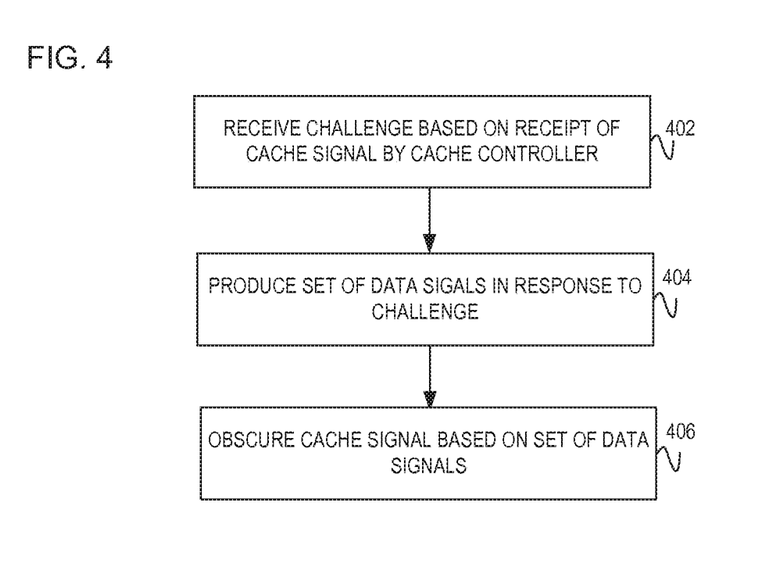
FIG. 4 is a flowchart of an example method executable by a set of PUF circuits to obscure a cache signal based on a set of data signals produced by the set of PUF circuits.

FIG. 4 illustrates a flowchart of an example method to obscure a cache signal based on a set of data signals. The method is executable by a set of PUF circuits to obscure the cache signal. The set of PUF circuits receive a challenge upon a cache controller receiving the cache signal. In response to receiving the challenge, the set of PUF circuits produces a data signal at each PUF circuit. Producing the data signal at each PUF circuit generates a set of various data signals. The set of data signals obscures the cache signal so the properties and/or characteristics associated with the cache signal are indistinguishable to a party attempting to hack the processor cache. In discussing FIG. 4, references may be made to the components in FIGS. 1-3 to provide contextual examples. In one implementation, the set of PUF circuits 208 as in FIG. 2 execute operations 402-406 to obscure the cache signal. Although FIG. 4 is described as implemented by the set of PUF circuits, it may be executed on other suitable components. For example, FIG. 4 may be executed by a single PUF circuit 108 as in FIG. 1.

At operation 402, the set of PUF circuits receive the challenge based on receipt of the cache signal by the cache controller. The cache signal is received by the processor routed to the cache controller. Upon the cache controller receiving the cache signal, the set of PUF circuits receive the challenge. The cache signal includes transaction data such as the type of transaction, including reading or writing data to cache. As such, the cache signal includes an address specifying in which area of the cache to read or write data. This address may be used as the challenge to the set of PUF circuits. Using the cache address as the challenge, each PUF circuit within the set of PUF circuits may generate a different data signal as at operation 404.

At operation 404, the set of PUF circuits produce the set of data signals in response to the challenged received at operation 402. The PUF circuits operate by consuming a set of bits which represents the challenge and in turn produces another set of bits that serves as a response to the applied challenge. The set of bits marked as the response serve as the data signals produced from each PUF circuit. In another implementation, the data signals produced by each PUF circuit varies from one PUF circuit to another PUF circuit. The response variation is based on the process variation of each circuit, for example the doping concentrations at the atom level. As such, each PUF circuit acts as a scrambler by leveraging the randomness inherent in each circuit, making it that much more difficult for the party to characterize and map the emissions from the cache signal into meaningful data.

At operation 406, the data signals as produced at operation 404 are used to obscure the cache signal. In this implementation, the emissions from each of the data signals are combined into the emissions of the cache signal. Combining the emissions of the various signals, disguises the emissions from the cache signal which may be mapped into information. Thus, the data signals obscure the cache signal.

Figure 5:
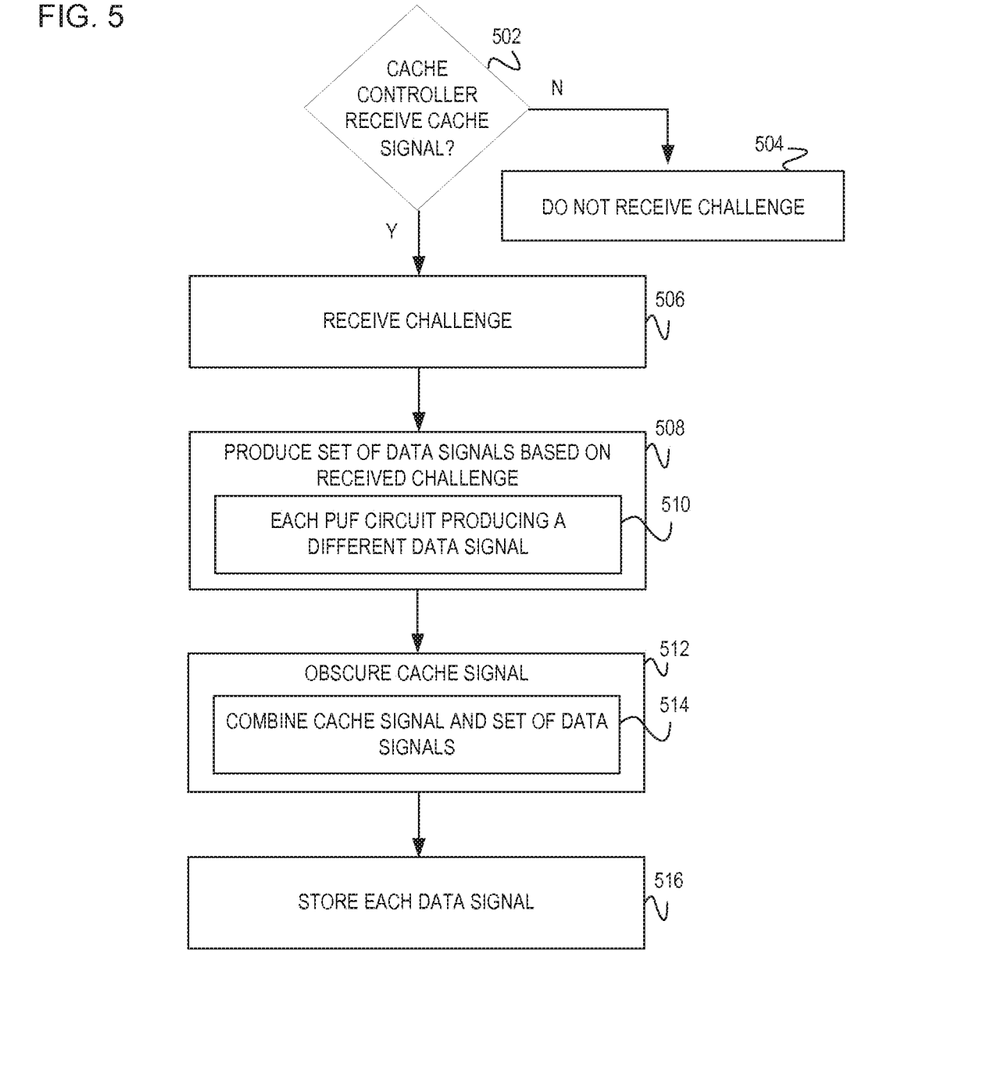
FIG. 5 is a block diagram of an example method executable by a set of PUF circuits to receive a challenge in response to a cache controller receiving a cache signal, the set of PUF circuits produce a set of data signals to obscure the cache signal.

FIG. 5 illustrates a flowchart of an example method to produce various data signals for obscuring a cache signal. The method is executable by a set of PUF circuits to obscure the cache signal. The set of PUF circuits receive an applied challenge based on the cache controller receiving the cache signal. The set of PUF circuits proceed to produce the various data signals in response to the received challenge. The various data signals are used to obscure the cache signal, such that the emissions of the cache signal and the various data signals are combined creating a mask or disguising the cache signal. In discussing FIG. 5, references may be made to the components in FIGS. 1-3 to provide contextual examples. In one implementation, the set of PUF circuits 208 as in FIG. 2 execute operations 502-516 to obscure the cache signal. Although FIG. 5 is described as implemented by the set of PUF circuits, it may be executed on other suitable components. For example, FIG. 5 may be executed by a single PUF circuit 108 as in FIG. 1. In another example, FIG. 5 may be executed by a cache controller 104 as in FIG. 1.

At operation 502, the cache controller may receive the cache signal. In one implementation, if the cache controller does not receive the cache signal, the set of PUF circuits do not receive the challenge as at operation 504. If the cache controller receives the cache signal, the set of PUF circuits proceed to operation 506 to receive the challenge.

At operation 504, based on the cache controller not receiving the cache signal, the set of PUF circuits do not receive the challenge. The cache signal includes the set of bits which are used as the applied challenge to each of the PUF circuits. In one implementation, the cache signal includes the address which serves as the applied challenge to each of the PUF circuits. Thus if there is no cache signal, there will be no applied challenge.

At operation 506, the set of PUF circuits receive the challenge. The cache signal provides the set of bits which is provided as the applied challenge to each of the PUF circuits. Thus, if the cache controller has not yet received the cache signal the applied challenge will not be provided to each of the PUF circuits. Operation 506 may be similar in functionality to operation 402 as in FIG. 4.

At operation 508, the set of PUF circuits produce the set of data signals upon receiving the challenge from the cache controller. In response to the challenged received from the cache controller, each PUF circuit generates the data signal as a response to the challenge. In one implementation, each PUF circuit produces a different data signal as at operation 510. Operation 508 may be similar in functionality to operation 404 as in FIG. 4.

At operation 510 in response to the received challenge, each PUF circuit produces the different data signal. The data signals may vary in properties, such as a bit interval, bit rate, intensity of the signal, transfer rate, bit distribution, etc. As such, these characteristics may vary from PUF circuit to PUF circuit which provides the different data signal being produced by each of the PUF circuits. The different data signals are generated based on a doping concentration of atoms corresponding to each PUF circuit and/or a type of each PUF circuit. For example, two PUF circuits may include different doping concentrations of atoms, thus upon each PUF circuit receiving the same challenge, each PUF circuit generates a different data signal in the response.

At operation 512, the set of PUF circuits obscure the cache signal through the production of the data signals at operations 508-510. In one implementation, the set of data signals are stored in various areas of cache simultaneously while storing the cache signal in the cache memory. The simultaneous storage allow the cache signals and the data signals to be combined in such a manner that the emissions are combined so that a party may not discern meaningful data from the cache signal or the data signals. Operation 512 may be similar in functionality to operation 406 as in FIG. 4.

At operation 514, the emissions from each of the cache signal and the data signals are combined so that the cache signal emissions are obscured.

At operation 516, the set of PUF circuits may transmit each of the data signals produced at operation 508 for storage in various areas of the cache. In one implementation, these data signals are stored in areas of the cache different from where the cache signal may be used to read and/or write data. This provides additional security making it more difficult for the party to distinguish where the data may be read or written from.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A system comprising:
a cache controller to receive a cache signal; and
a physical unclonable function (PUF) circuit, coupled to the cache controller, to obscure the cache signal in response to the cache signal receipt.

2. The system of claim 1 wherein to obscure the cache signal, the PUF circuit is to:
receive a challenge upon the cache controller receiving the cache signal;
generate a data signal as a response to the challenge; and
combine the data signal and the cache signal for obscuring the cache signal.

3. The system of claim 2 comprising:
a different PUF circuit to:
receive the challenge upon the cache controller receiving the cache signal; and
generate a different data signal in response to the challenge.

4. The system of claim 1:
a cache memory, coupled to the cache controller and isolated from the PUF circuit, to receive the cache signal.

5. The system of claim 1 wherein the PUF circuit is part of a set of PUF circuits, the set of PUF circuits is to:
produce a set of data signals, wherein each produced data signal varies between each of the PUF circuits.

6. A method, executable by a set of physical unclonable function (PUF) circuits, the method comprising:
receiving a challenge in response to a cache controller receiving a cache signal;
producing a set of data signals in response to the received challenge; and
obscuring the cache signal based on the set of data signals.

7. The method of claim 6 wherein obscuring the cache signal based on the set of data signals comprises:
combining the cache signal and the set of data signals to obscure the cache signal.

8. The method of claim 6 wherein producing the set of data signals in response to the received challenge comprises:
producing a different data signal from each PUF circuit within the set of PUF circuits.

9. The method of claim 6 wherein each of the data signals in the set of data signals vary in accordance to an atom doping concentration at each PUF circuit in the set of PUF circuits.

10. The method of claim 6 comprising:
storing each of the data signals in the set of data signals.

11. A system comprising:
a cache controller to receive a cache signal; and
a set of PUF circuits, coupled to the cache controller to:
receive a challenge in response to the receipt of the cache signal;
produce a set of data signals in response to the received challenge; and
obscure the cache signal based on the set of data signals.

12. The system of claim 11 comprising:
a multiplexer, coupled to the set of PUF circuits, to receive the set of data signals;
a counter, coupled to the multiplexer, to identify which data signal among the data signals to use as a different challenge to a different set of PUF circuits.

13. The system of claim 12 comprising:
the different set of PUF circuits, coupled to the multiplexer, to:

receive the different challenge; and
produce a different set of data signals; and
combine the different set of data signals and the cache signal to obscure the cache signal.

14. The system of claim 11 wherein the set of PUF circuits are connected in a parallel manner to one another.

15. The system of claim 11 wherein each data signal from the set of data signals produced by the set of PUF circuits is based on an atom doping concentration of each PUF circuit.

* * * * *